(12) United States Patent
Kang et al.

(10) Patent No.: US 11,271,697 B2
(45) Date of Patent: Mar. 8, 2022

(54) METHOD FOR HANDLING COLLISION BETWEEN CSI-RS AND DMRS IN WIRELESS COMMUNICATION SYSTEM, AND DEVICE THEREFOR

(71) Applicant: LG Electronics Inc., Seoul (KR)

(72) Inventors: Jiwon Kang, Seoul (KR); Jonghyun Park, Seoul (KR); Haewook Park, Seoul (KR); Hyunsu Cha, Seoul (KR)

(73) Assignee: LG Electronics Inc., Seoul (KR)

(*) Notice: Subject to any disclaimer, the term of this patent is extended or adjusted under 35 U.S.C. 154(b) by 56 days.

(21) Appl. No.: 16/646,476

(22) PCT Filed: Sep. 10, 2018

(86) PCT No.: PCT/KR2018/010551
§ 371 (c)(1),
(2) Date: Mar. 11, 2020

(87) PCT Pub. No.: WO2019/050359
PCT Pub. Date: Mar. 14, 2019

(65) Prior Publication Data
US 2020/0295894 A1    Sep. 17, 2020

Related U.S. Application Data

(60) Provisional application No. 62/557,068, filed on Sep. 11, 2017.

(51) Int. Cl.
*H04L 5/00* (2006.01)
*H04W 24/10* (2009.01)
*H04W 74/08* (2009.01)

(52) U.S. Cl.
CPC .......... *H04L 5/0048* (2013.01); *H04L 5/0053* (2013.01); *H04W 24/10* (2013.01); *H04W 74/0825* (2013.01)

(58) Field of Classification Search
CPC .... H04L 5/0048; H04L 5/0053; H04W 24/10; H04W 74/0825
See application file for complete search history.

(56) References Cited

U.S. PATENT DOCUMENTS 10,129,782 B2 * 11/2018 Novlan ................. H04L 5/0053
2013/0094411 A1 * 4/2013 Zhang ................... H04L 5/0048
                                                                370/281

(Continued)

FOREIGN PATENT DOCUMENTS

WO    WO-2014182837 A1 * 11/2014 ........... H04L 5/0096
WO    WO-2019050359 A1 *  3/2019 ........... H04L 5/0026

OTHER PUBLICATIONS

EP Partial Supplementary European Search Report in European Appln. No. 18854727.7, dated Apr. 20, 2021, 19 pages.

(Continued)

*Primary Examiner* — Deepa Belur
(74) *Attorney, Agent, or Firm* — Fish & Richardson P.C.

(57) ABSTRACT

The present specification provides a method for handling a collision between a demodulation reference signal (DMRS) and a channel state information-reference signal (CSI-RS) in a wireless communication system. Specifically, the method performed by a terminal comprises the steps of: receiving a DMRS from a base station; receiving a CSI-RS from the base station; and when a collision between the DMRS and the CSI-RS occurs on at least one resource element (RE), puncturing a resource associated with the DMRS, or a resource associated with the CSI-RS on the basis of time domain behavior of the CSI-RS.

16 Claims, 14 Drawing Sheets

(56) References Cited

U.S. PATENT DOCUMENTS

| | | | |
|---|---|---|---|
| 2015/0063286 A1 | 3/2015 | Safavi et al. | |
| 2016/0227428 A1 | 8/2016 | Novlan et al. | |
| 2016/0227548 A1 | 8/2016 | Nimbalker et al. | |
| 2018/0331799 A1* | 11/2018 | Zhang | H04L 5/0023 |
| 2021/0084663 A1* | 3/2021 | Takeda | H04L 5/0051 |

OTHER PUBLICATIONS

Intel Corporation, "On multiplexing of different RS types," R1-1712556, 3GPP TSG RAN WG1 Meeting #90, Prague, P.R. Czech, dated Aug. 21-25, 2017, 4 pages.

Nokia, Alcatel-Lucent Shanghai Bell, "On Multiplexing of Different RS Types," R1-1711302, 3GPP TSG-RAN WG1 NR AH#2, Qingdao, P.R. China, dated Jun. 27-30, 2017, 4 pages.

Zte, "Discussion on rate matching," R1-1712290, 3GPP TSG RAN WG1 Meeting #90, Prague, Czechia, dated Aug. 21-25, 2017, 3 pages.

Catt, "Discussion on RS multiplexing," R1-1712380, 3GPP TSG RAN WG1 Meeting #90, Prague, Czechia, dated Aug. 21-25, 2017, 5 pages.

Huawei, HiSilicon, "Multiplexing different types of DL RS," R1-1712250, 3GPP TSG RAN WG1 Meeting #90, Prague, Czech Republic, dated Aug. 21-25, 2017, 10 pages.

Lg Electronics, "On CSI-RS design for CSI acquisition," R1-1710293, 3GPP TSG RAN WG1 NR Ad-Hoc#2, Qingdao, P.R. China, dated Jun. 27-30, 2017, 10 pages.

Spreadtrum Communications, "On RS multiplexing," R1-1713051, 3GPP TSG RAN WG1 Meeting #90, Prague, Czech Rep., dated Aug. 21-25, 2017, 10 pages.

Catt, "Remaining issues on CSIRS design," R1-103483, Presented at 3GPP TSG RAN WG1 Meeting #61 bis, Dresden, Germany, 28th Jun-Jul. 2, 2010, 5 pages.

EP Extended European Search Report in European Appln. No. 18854727.7, dated Jul. 7, 2021, 25 pages.

Intel Corporation, "Remaining details of CSI-RS design for 12 and 16 antenna ports," R1-156519, Presented at 3GPP TSG RAN WG1 Meeting #83, Anaheim, USA, Nov. 15-22, 2015, 4 pages.

LG Electronics, "On CSI-RS design for beam management," R1-1713154, 3GPP TSG RAN WG1 Meeting #90, Prague, Czech Republic, Aug. 21-25, 2017, 5 pages.

Zte, "On CSI-RS for CSI acquisition," R1-1712303, Presented at 3GPP TSG RAN WG1 Meeting #90, Prague, Czechia, Aug. 21-25, 2017, 6 pages.

\* cited by examiner dmrs-TypeA-Position=3

METHOD FOR HANDLING COLLISION BETWEEN CSI-RS AND DMRS IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2018/010551, filed on Sep. 10, 2018, which claims the benefit of U.S. Provisional Application No. 62/557,068, filed on Sep. 11, 2017, the contents of which are all hereby incorporated by reference herein in their entirety.

TECHNICAL FIELD

The disclosure relates to wireless communication systems, and more specifically, to a method for handling collision between a demodulation reference signal (DMRS) and channel state information (CSI)-RS and apparatus for supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DETAILED DESCRIPTION OF THE DISCLOSURE

Technical Problems

The disclosure aims to provide a method for handling collision between a DMRS and CSI-RS considering the time domain behavior of the CSI-RS.

Objects of the present disclosure are not limited to the foregoing, and other unmentioned objects would be apparent to one of ordinary skill in the art from the following description.

Technical Solutions

According to the disclosure, there is provided a method for handling a collision between a demodulation reference signal (DMRS) and a channel state information-reference signal (CSI-RS) in a wireless communication system.

Specifically, the method comprises receiving the DMRS from a base station, receiving the CSI-RS from the base station, and when a collision occurs in at least one resource element (RE) between the DMRS and the CSI-RS, puncturing a resource related to the DMRS or a resource related to the CSI-RS based on a time domain behavior of the CSI-RS.

Further, in the disclosure, if the time domain behavior of the CSI-RS is of an aperiodic CSI-RS, the CSI-RS-related resource is punctured.

Further, in the disclosure, puncturing the CSI-RS-related resource includes performing measurement based on a CSI-RS received in a resource which does not include the at least one RE and reporting information for the measurement to the base station.

Further, in the disclosure, the information for the measurement includes information related to the collision.

Further, in the disclosure, the CSI-RS-related resource is a CSI-RS RE that has a CDM relationship, in at least one of a time domain or a frequency domain, with the at least one colliding RE.

Further, the method further comprises estimating a channel state based on the received CSI-RS and reporting information for the estimated channel state to the base station. The information for the channel state includes information related to the collision.

Further, in the disclosure, the collision-related information includes at least one of information for the number of antenna ports where the collision does not occur or information indicating that a collision has occurred in the CSI-RS-related resource.

Further, in the disclosure, if the time domain behavior of the CSI-RS is of a periodic or semi-persistent (SP) CSI-RS, the DMRS-related resource is punctured.

Further, in the disclosure, puncturing the DMRS-related resource includes performing demodulation based on a DMRS received in a resource that does not include the at least one RE.

Further, the method further comprises receiving information related to an additional DMRS configuration from the base station.

Further, in the disclosure, the additional DMRS configuration is determined based on the number of DMRS symbols where the collision has occurred.

Further, according to the disclosure, a UE for handling a collision between a demodulation reference signal (DMRS) and a channel state information-reference signal (CSI-RS) in a wireless communication system comprises a radio frequency (RF) module for transmitting/receiving a radio signal and a processor functionally connected with the RF module, wherein the processor is configured to receive the DMRS from a base station, receive the CSI-RS from the base station, and when a collision occurs in at least one resource element (RE) between the DMRS and the CSI-RS, puncture a resource related to the DMRS or a resource related to the CSI-RS based on a time domain behavior of the CSI-RS.

Advantageous Effects

The disclosure may increase system performance by puncturing the resources of either a CSI-RS or DMRS when a collision occurs between the CSI-RS and DMRS.

Effects of the present disclosure are not limited to the foregoing, and other unmentioned effects would be apparent to one of ordinary skill in the art from the following description.

BRIEF DESCRIPTION OF THE DRAWINGS

A more complete appreciation of the present disclosure and many of the attendant aspects thereof will be readily

MODE FOR CARRYING OUT THE DISCLOSURE

Figure 1:
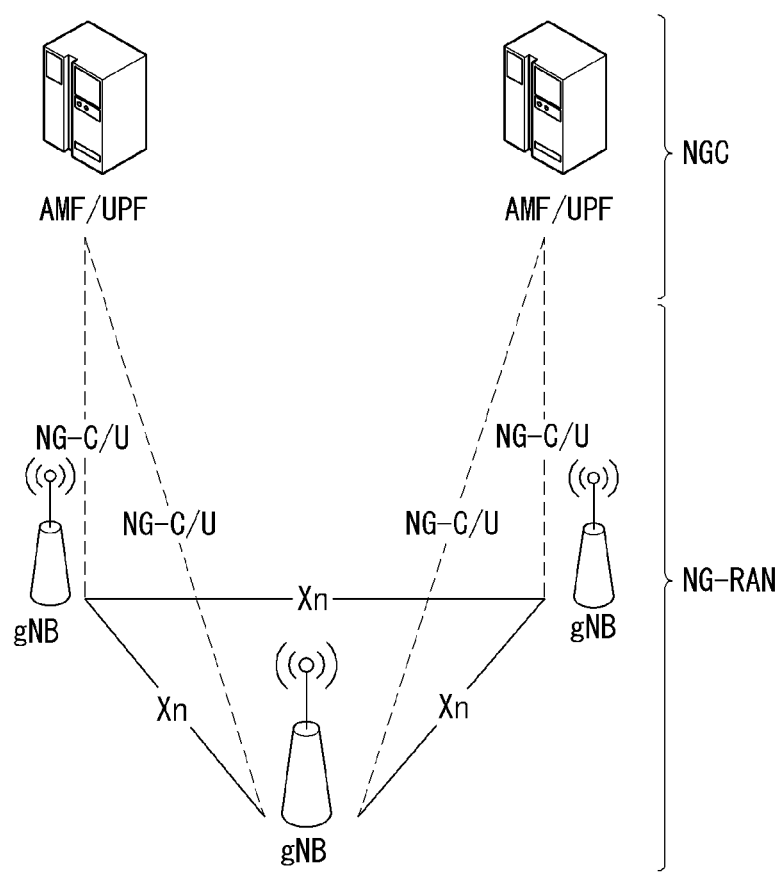
FIG. 1 is a view illustrating an example overall NR system structure to which a method as proposed in the disclosure may apply.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

Definition of Terms eLTE eNB, An eLTE eNB is an evolution of an eNB that supports a connection for an EPC and an NGC.

gNB, A node for supporting NR in addition to a connection with an NGC

New RAN, A radio access network that supports NR or E-UTRA or interacts with an NGC Network slice, A network slice is a network defined by an operator so as to provide a solution optimized for a specific market scenario that requires a specific requirement together with an inter-terminal range.

Network function, A network function is a logical node in a network infra that has a well-defined external interface and a well-defined functional operation.

NG-C, A control plane interface used for NG2 reference point between new RAN and an NGC NG-U, A user plane interface used for NG3 reference point between new RAN and an NGC Non-standalone NR, A deployment configuration in which a gNB requires an LTE eNB as an anchor for a control plane connection to an EPC or requires an eLTE eNB as an anchor for a control plane connection to an NGC Non-standalone E-UTRA, A deployment configuration an eLTE eNB requires a gNB as an anchor for a control plane connection to an NGC.

User plane gateway, A terminal point of NG-U interface General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
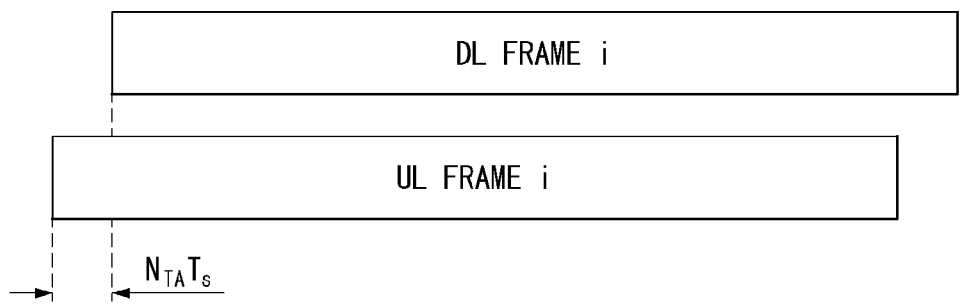
FIG. 2 illustrates the relationship between an uplink frame and downlink frame in a wireless communication system to which a method as proposed in the disclosure may apply.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}slots,\mu-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^{\mu}$ | $N_{frame}^{slots, \mu}$ | $N_{subframe}^{slots, \mu}$ | $N_{symb}^{\mu}$ | $N_{frame}^{slots, \mu}$ | $N_{subframe}^{slots, \mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
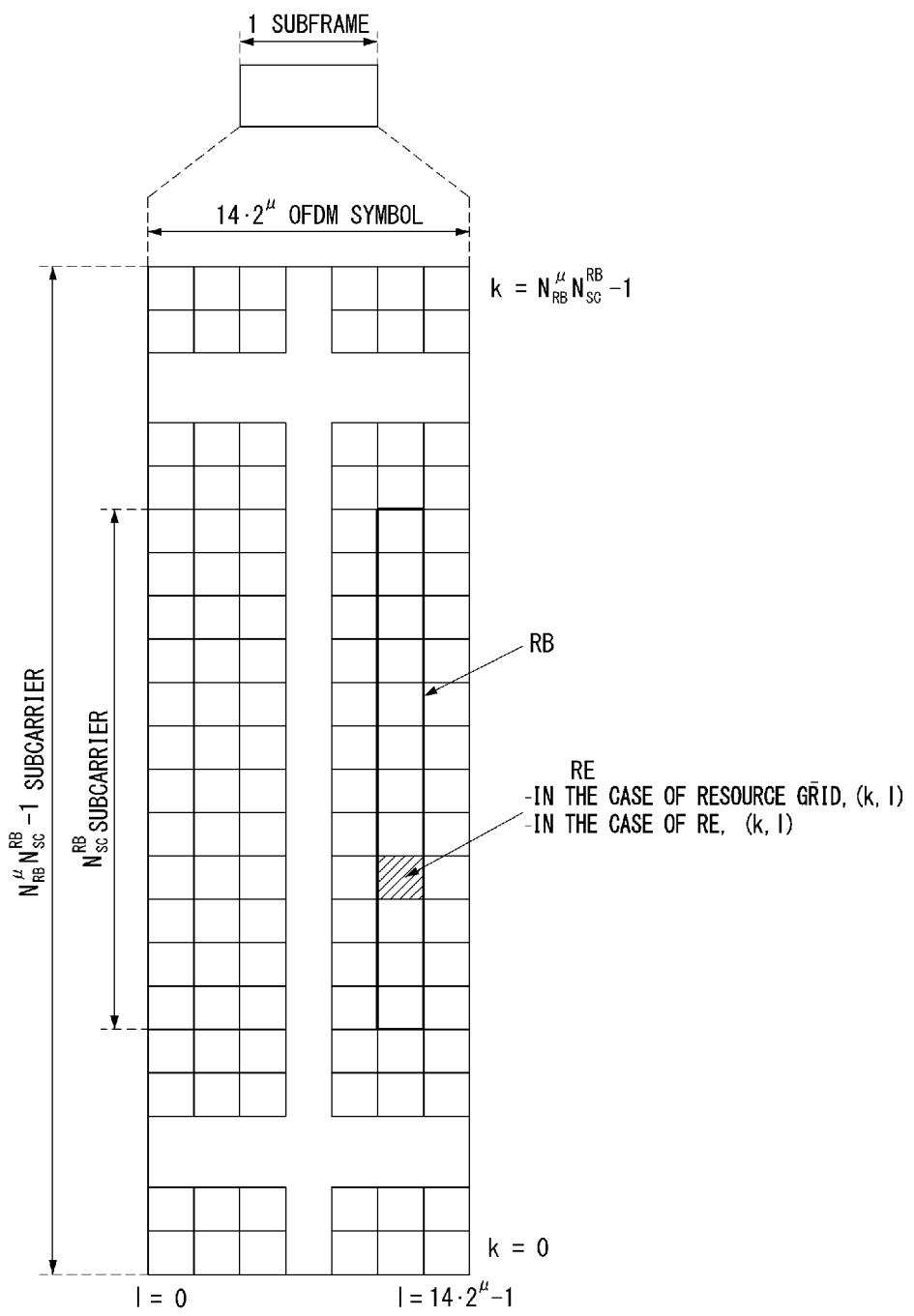
FIG. 3 illustrates an example resource grid supported in a wireless communication system to which a method as proposed in the disclosure may apply.

FIG. 3 illustrates an example of a resource grid supported in a wireless communication system to which a method proposed by the present disclosure may be implemented.

Referring to FIG. 3, a resource grid is composed of $N_{RB}^{\mu} N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols Herein, $N_{RB}^{\mu} \leq N_{RB}^{max, \mu}$.

The above $N_{RB}^{max, \mu}$ indicates the maximum transmission bandwidth, and it may change not just between numerologies, but between UL and DL.

In this case, as illustrated in FIG. 3, one resource grid may be configured for the numerology μ and an antenna port p.

Each element of the resource grid for the numerology μ and the antenna port p is indicated as a resource element, and may be uniquely identified by an index pair (k,l̄). Herein, k=0, . . . , $N_{RB}^{\mu} N_{sc}^{RB}-1$ is an index in the frequency domain, and l̄=0, . . . , $2^{\mu} N_{symb}^{(\mu)}-1$ indicates a location of a symbol in a subframe. To indicate a resource element in a slot, the index pair (k,l) is used. Herein, l=0, . . . ,$N_{symb}^{\mu}-1$.

The resource element (k,l̄) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k, l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Structure of Self-Contained Subframe

Figure 4:
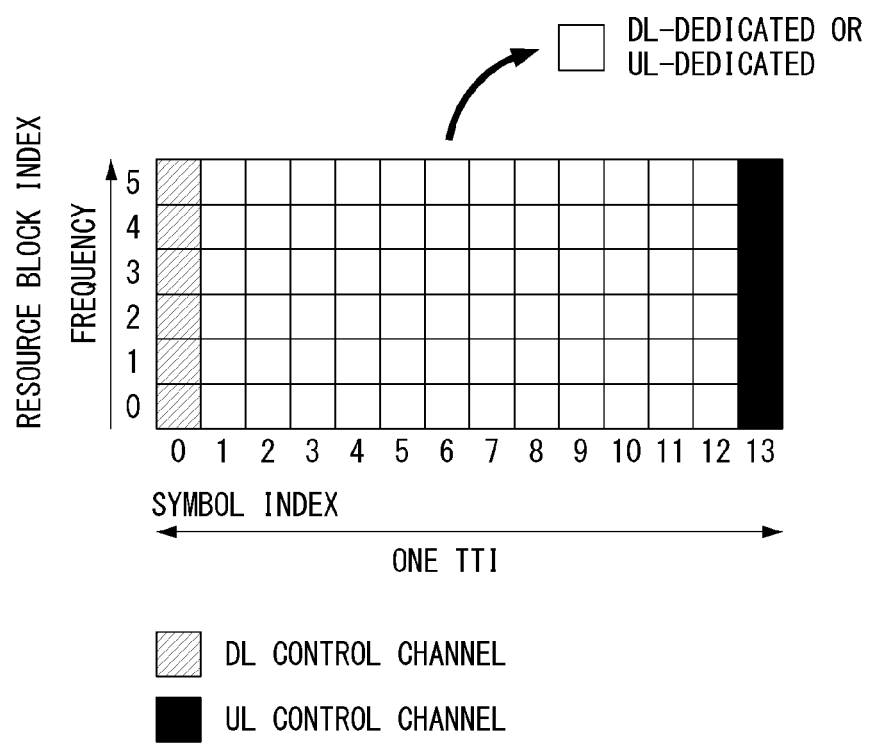
FIG. 4 illustrates an example self-contained subframe to which a method as proposed in the disclosure may apply.

FIG. 4 is a view illustrating the structure of a self-contained subframe in a wireless communication system to which the disclosure is applicable.

To ensure the minimum transmission latency in TDD systems, fifth generation (5G) new RAT considers a self-contained subframe structure as shown in FIG. 4.

In FIG. 4, the hatched regions (symbol index 0) denote the downlink (DL) control regions, and the solid dark regions (symbol index 13) denote the uplink (UL) control regions. The non-shading regions may be used for DL data transmission or UL data transmission. Such structure features that DL transmission and UL transmission are sequentially performed in one subframe so that DL data may be sent and UL ACK/NACK may be received in the subframe. Resultantly, this may reduce time taken to retransmit data when a data transmission error occurs, thus minimizing the latency of final data transfer.

In such a self-contained subframe structure, a time gap is required for a switch of the base station and UE from transmission mode to reception mode or switch from reception mode to transmission mode. To that end, in the self-contained subframe structure, some OFDM symbols at the time that DL switches to UL are set as a guard period (GP).

Analog Beamforming

Millimeter wave (mmW) allows for installation of multiple antenna elements in the same area thanks to its short wavelength. In other words, in the 30 GHz band, the wavelength is 1 cm, and a total of 64 (8×8) antenna elements may be installed in a 2-dimensional array at every 0.5 lambda (i.e., wavelength) interval in the 4×4 (4 by 4) (cm) panel. Hence, mmW increases coverage or throughput by raising beamforming (BF) gain by use of multiple antenna elements.

In this case, a transceiver unit (TXRU) to enable adjustment of transmission power and phase per antenna element allows for independent beamforming per frequency resource. However, installing TXRUs in all of the 100 antenna elements is impracticable in terms of price. Hence, a scheme being in consideration is to map multiple antenna elements to one TXRU and to adjust the direction of beam with an analog phase shifter. Such analog BF scheme may create only one beam direction over the entire band and is thus unable to achieve selective BF.

As a middle form between digital BF and analog BF, there may be considered hybrid BF with B TXRUs which are fewer than Q antenna elements. In this case, although there are differences in connections between B TXRUs and Q antenna elements, the number of beam directions in which simultaneous transmission is possible is limited to B or less.

Representative example connections between TXRU and antenna element are described with reference to the drawings.

Figure 5:
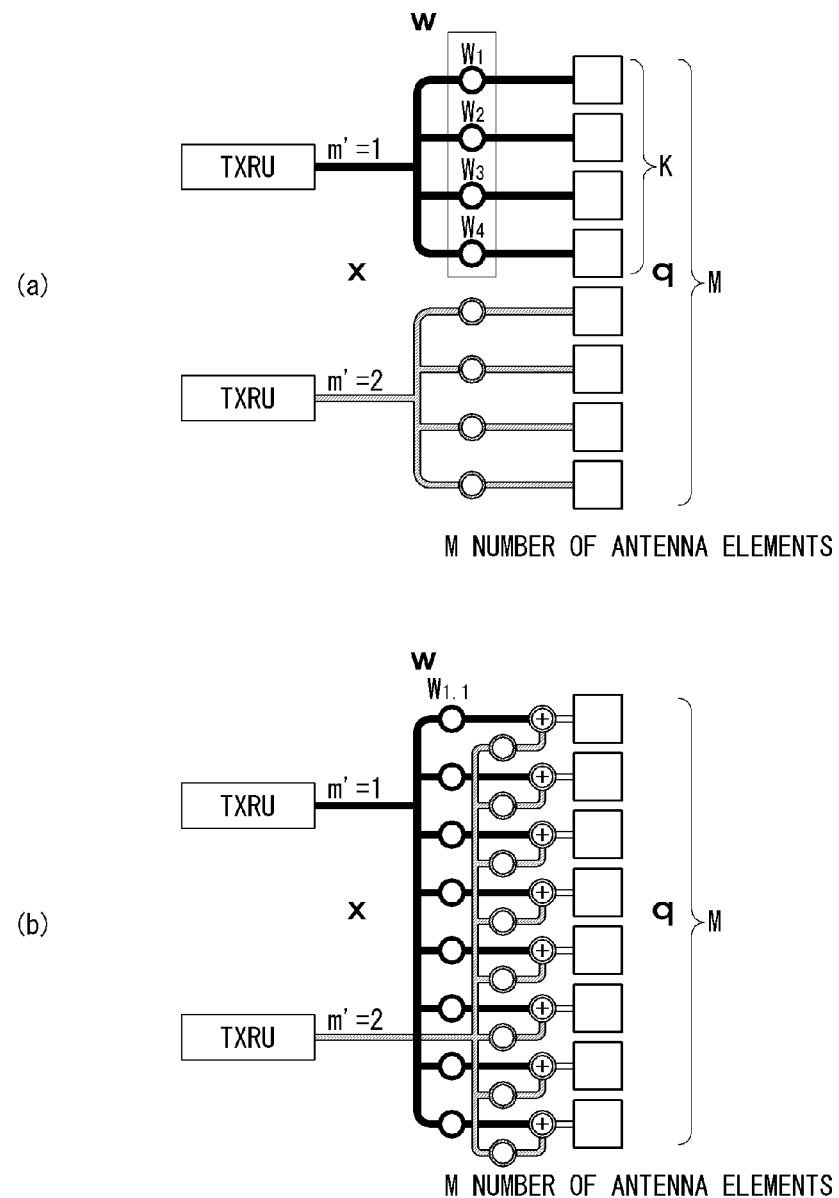
FIG. 5 illustrates an example transceiver unit model in a wireless communication system to which the disclosure may apply.

FIG. 5 illustrates an example transceiver unit model in a wireless communication system to which the disclosure may apply.

The TXRU virtualization model represents the relationship between TXRU output signal and antenna element output signal. Depending on the correlation between antenna element and TXRU, they may be divided into TXRU virtualization model option-1: sub-array partition model as shown in FIG. 5(a) and TXRU virtualization model option-2: full-connection model as shown in FIG. 5(b).

Referring to FIG. 5(a), in the case of sub-array partition model, antenna elements are split into multiple antenna element groups, and each TXRU is connected with one of the groups. In this case, the antenna element is connected to only one TXRU.

Referring to FIG. 5(b), in the case of full-connection model, multiple TXRU signals are combined and transmitted to a single antenna element (or antenna element array). In other words, this denotes a scheme in which the TXRUs are connected to all the antenna elements. In this case, the antenna element is connected to all the TXRUs.

In FIG. 5, q is the transmission signal vector of M co-polarized antenna elements in one column. w is the wideband TXRU virtualization weight vector, and W refers to the phase vector multiplied by the analog phase shifter. That is, the direction of analog beamforming is determined by W. x is the signal vector of M_TXRU TXRUs.

Here, mapping between antenna ports and TXRUs may be 1-to-1 or 1-to-many.

The TXRU-to-element mapping shown in FIG. 5 is merely an example, and the disclosure is not limited thereto. The disclosure may apply likewise to TXRU-to-antenna element mapping that may be implemented in other various forms in terms of hardware.

Demodulation Reference Signal (DMRS) for PUSCH

First, sequence generation for DMRS is described.

Where transform precoding for PUSCH is not enabled (that is, in the case of CP-OFDM), reference signal sequence r(m) is generated by Equation 2 below.

$$r(m) = \frac{1}{\sqrt{2}}(1 - 2 \cdot c(2m)) + j\frac{1}{\sqrt{2}}(1 - 2 \cdot c(2m+1))$$ [Equation 2]

Where transform precoding for PUSCH is enabled (that is, in the case of DFT-s-OFDM), reference signal sequence r(m) is generated by Equation 3 below.

$$r(m) = e^{-j\frac{\pi qm(n+1)}{L}}$$ [Equation 3]

Next, mapping to physical resources is described.

As given by higher layer signaling, a PUSCH DM-RS is mapped to physical resources according to (DMRS configuration) type 1 or 2.

For PUSCH DM-RS type 1, the sequence r(m) is to be mapped to physical reference elements by Equation 4 below.

$$a_{k,l}^{(p,\mu)} = e^{j\varphi_k} \cdot w_f(l') \cdot r(m+m_0)$$

$$k = k_0 + 2m + \Delta$$

$$l = l_0 + l'$$ [Equation 4]

In Equation 4, l', $w_t(l')$, $\varphi_k$ and $\Delta$ are given by Table 4 below.

For PUSCH DM-RS type 2, the sequence r(m) is to be mapped to physical resources by Equation 5 below.

$$a_{k,l}^{(p,\mu)} = w_f(l') \cdot r(m+m_0)$$

$$k = k_0 + 6m + k' + \Delta$$

$$l = l_0 + l'$$ [Equation 5]

Here, $w_f(k')$, $w_t(l')$, and $\Delta$ are given by Table 5 below, and PUSCH DM-RS type 2 is not supported when transform precoding for PUSCH is enabled.

Quantity ($l_0$) is defined relative to the start of PUSCH transmission.

Table 4 represents example parameters for PUSCH DM-RS type 1.

TABLE 4

| Antenna port | | | $w_t(l')$ = [$w_t(0)$ $w_t(1)$] | |
|---|---|---|---|---|
| p | Δ | $\varphi_k$ | One symbol | Two symbol |
| 1000 | 0 | 0 | [+1] | [+1 +1] |
| 1001 | 1 | 0 | [+1] | [+1 +1] |
| 1002 | 0 | π(k mod2) | [+1] | [+1 +1] |
| 1003 | 1 | π(k mod2) | [+1] | [+1 +1] |
| 1004 | 0 | 0 | — | [+1 −1] |
| 1005 | 1 | 0 | — | [+1 −1] |
| 1006 | 0 | π(k mod2) | — | [+1 −1] |
| 1007 | 1 | π(k mod2) | — | [+1 −1] |

Table 5 represents example parameters for PUSCH DM-RS type 2.

TABLE 5

| Antenna port | | | $w_t(l')$ = [$w_t(0)$ $w_t(1)$] | |
|---|---|---|---|---|
| p | Δ | $w_f(l')$ = [$w_f(0)$ $w_f(1)$] | One symbol | Two symbol |
| 1000 | 0 | [+1 +1] | [+1] | [+1 +1] |
| 1001 | 0 | [+1 −1] | [+1] | [+1 +1] |
| 1002 | 2 | [+1 +1] | [+1] | [+1 +1] |
| 1003 | 2 | [+1 −1] | [+1] | [+1 +11] |
| 1004 | 4 | [+1 +1] | [+1] | [+1 +1] |
| 1005 | 4 | [+1 −1] | [+1] | [+1 +1] |
| 1006 | 0 | [+1 +1] | — | [+1 −1] |
| 1007 | 0 | [+1 −1] | — | [+1 −1] |
| 1008 | 2 | [+1 +1] | — | [+1 −1] |
| 1009 | 2 | [+1 −1] | — | [+1 −1] |
| 1010 | 4 | [+1 +1] | — | [+1 −1] |
| 1011 | 4 | [+1 −1] | — | [+1 −1] |

DMRS for PDSCH

First, a DMRS sequence for PDSCH is generated by Equation 6 below.

In other words, the UE assumes that the reference signal sequence r(m) is defined by Equation 6 below.

$$r(m) = \frac{1}{\sqrt{2}}(1 - 2 \cdot c(2m)) + j\frac{1}{\sqrt{2}}(1 - 2 \cdot c(2m + 1))  \quad \text{[Equation 6]}$$

Next, mapping to physical resources is described.

As given by higher layer signaling, the UE assumes that a PDSCH DMRS is mapped to physical resources according to (DMRS configuration) type 1 or 2.

For PDSCH DM-RS type 1, the sequence r(m) is to be mapped to physical reference elements by Equation 4 above.

For PDSCH DM-RS type 2, the sequence r(m) is to be mapped to physical resources by Equation 5 above.

For Equation 5 above, in the case of PDSCH DMRS, quantity ($l_0$) relies on a specific higher layer parameter, For PDSCH mapping type A, in the case of $N_{RB,DL}^{max, \mu}$ ≤X, $l_0$=4, otherwise $l_0$=3, For PDSCH mapping type B, $l_0$ is defined so that DMRS is mapped to the OFDM symbol right after the CORE-SET where PDCCH scheduling associated with PDSCH transmission has been detected.

CSI Reporting

NR supports the following three time-domain behaviors in relation to CSI reporting.

Similarly, reporting for (analog) beam management may also support all or some of the three time-domain behaviors.

(1) Aperiodic CSI reporting

CSI reporting is performed only upon triggering.

(2) Semi-persistent CSI reporting

If activated, CSI reporting starts (in a specific period) and, if deactivated, CSI reporting stops.

(3) Periodic CSI reporting

CSI reporting is performed with the slot offset and periodicity set by RRC.

Further, upon CSI acquisition, DL RS (downlink reference signal) for channel measurement may support three time-domain behaviors as follows. Similarly, DL RS for beam management may also support all or some of the three time-domain behaviors.

In DL RS for beam management, CSI-RS may be included as default, and other downlink signals are also likely to be utilized.

As other example downlink signals, mobility RS, beam RS, synchronization signal(SS), SS block, DL DMRSs(e.g. PBCH DMRS, PDCCH DMRS) may be utilized.

(1) Aperiodic CSI-RS

CSI-RS measurement is performed only when triggered (2) Semi-persistent CSI-RS

If activated, CSI-RS measurement starts (in a specific period) and, if deactivated, CSI-RS measurement stops.

(3) Periodic CSI-RS

CSI-RS measurement is performed with the slot offset and periodicity set by RRC.

Further, upon CSI acquisition, zero-power (ZP) CSI-RS-based interference measurement schemes that used to be used for LTE may be supported for the interference measurement resource (IMR) that the base station designates for the UE.

Further, at least one of non-zero-power (NZP) CSI-RS-based interference measurement scheme or DMRS-based interference measurement scheme may be supported.

In particular, while in LTE system ZP CSI-RS-based IMR is configured semi-statically (via RRC signaling), a dynamically configuring scheme is scheduled to be supported in NR. Also, the following three time-domain behaviors may be supported.

(1) Aperiodic IMR with ZP CSI-RS (2) Semi-persistent IMR with ZP CSI-RS (3) Periodic IMR with ZP CSI-RS Thus, available are combinations of various time domain behaviors, as follows, for channel estimation, interference estimation, and reporting constituting CSI measurement and reporting. (hereinafter, AP: aperiodic, SP: semi-persistent, and PR: periodic)

Ex1) AP CSI reporting with AP/SP/PR NZP CSI-RS for channel measurement and AP/SP/PR ZP CSI-RS for interference measurement Ex2) SP CSI reporting with SP/PR NZP CSI-RS for channel measurement and SP/PR ZP CSI-RS for interference measurement Ex3) PR CSI reporting with PR NZP CSI-RS for channel measurement and PR ZP CSI-RS for interference measurement In the above examples, AP RS/IMR, SP RS/IMR, and PR RS/IMR have been assumed to be used only for AP reporting, only for AP or SP reporting, and for all reporting, respectively. However, the disclosure is not limited thereto.

Further, RS and IMR both are included in resource setting, and their purposes, i.e., whether they are for channel estimation or for interference estimation, may be indicated via a setting for each link.

Further, the bandwidth (BW) of CSI-RS may carry not only the legacy wideband CSI-RS but also another RS known as the partial band CSI-RS.

Here, the partial band may be defined in bandwidth part (BWP) units which are frequency units with the same numerology (e.g., subcarrier spacing) or for some PRB sets in the BWP.

Such CSI-RS band configuration may be indicated by a resource setting which is an RRC layer message.

Described below is a frequency division multiplexing (FDM) method between a DMRS and a specific RS (e.g., CSI-RS or SRS).

The NR system supports two DMRS types depending on frequency domain patterns. This is described in detail with reference to FIG. 6.

Figure 6:
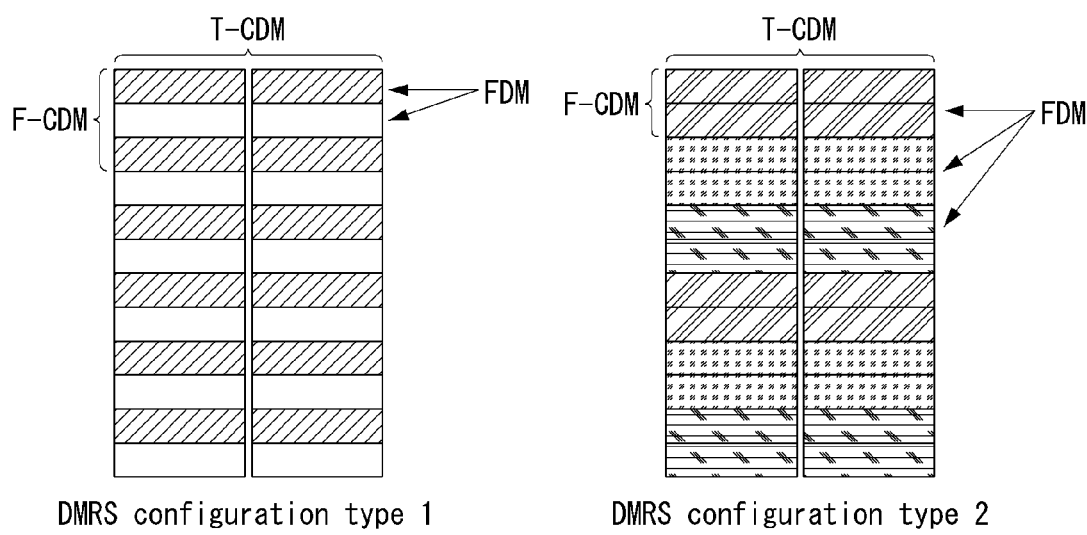
FIG. 6 illustrates an example DMRS type.

FIG. 6 illustrates an example DMRS type.

The number of DMRS symbols may be one, two, or more.

In the NR system, the number of symbols included in one slot may be 14, or 7 or less (in the case of mini-slots) or others.

The mini-slot means a slot constituted of 2, 4, or 7 symbols.

In a slot constituted of 14 or 7 symbols, the symbol position of the first DMRS for physical downlink shared channel (PDSCH) or physical uplink shared channel (PUSCH) demodulation may be determined to be the third or fourth symbol position depending on the system bandwidth.

The second DMRS symbol may be transmitted immediately behind the first DMRS symbol or may be omitted.

Separately from the one-symbol or two-symbol DMRS (known as 'front-loaded DMRS'), a DMRS known as 'additional DMRS' may be additionally transmitted in the middle or later part of the slot) for, e.g., high Doppler UE.

The DMRS design (or configuration) method may apply to both downlink (DL) and uplink (UL).

The above-described DMRS design method is also applicable to sidelink (SL) later.

The SL DMRS may follow the properties of UL DMRS in light that it is a DMRS the UE transmits.

In other words, the UL DMRS-related technology as proposed in the disclosure is applicable to SL DMRS.

Figure 7:
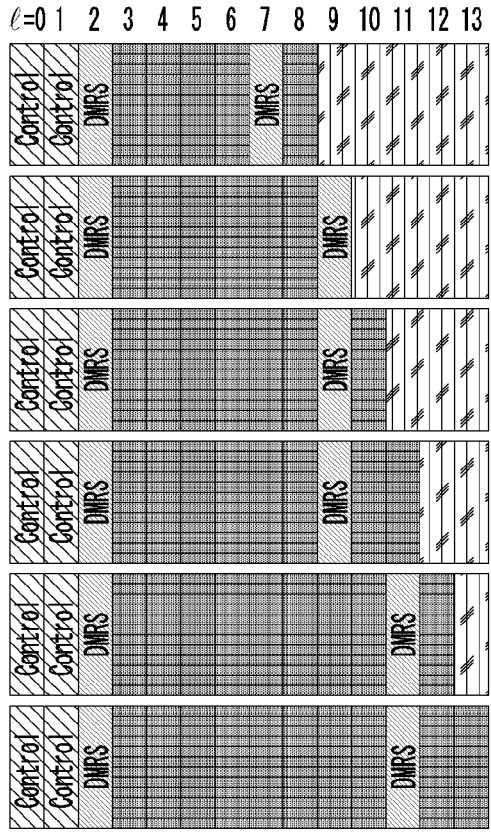
FIG. 7 illustrates an example DMRS position.
Figure 7:
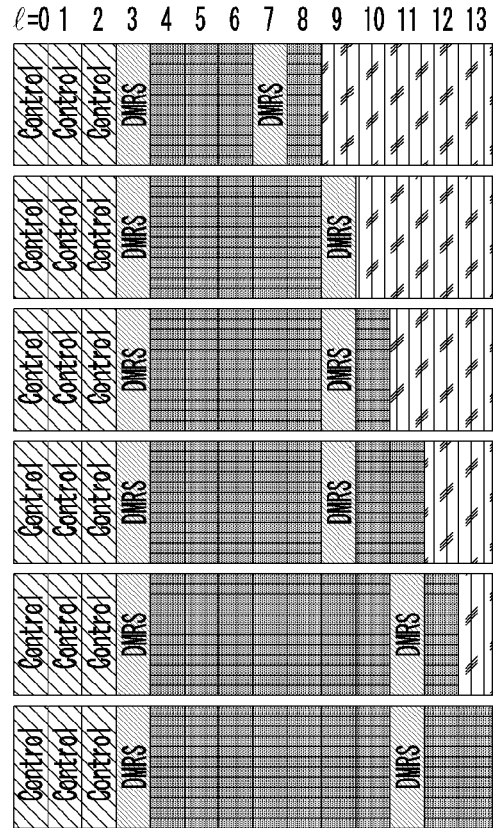
Figure 7:
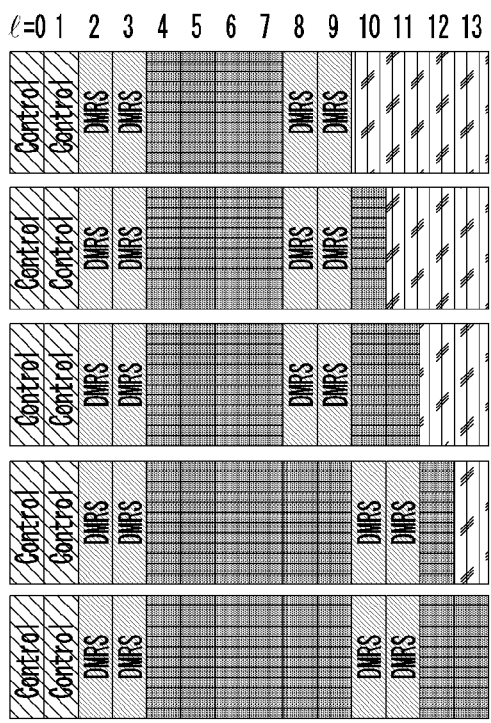
Figure 7:
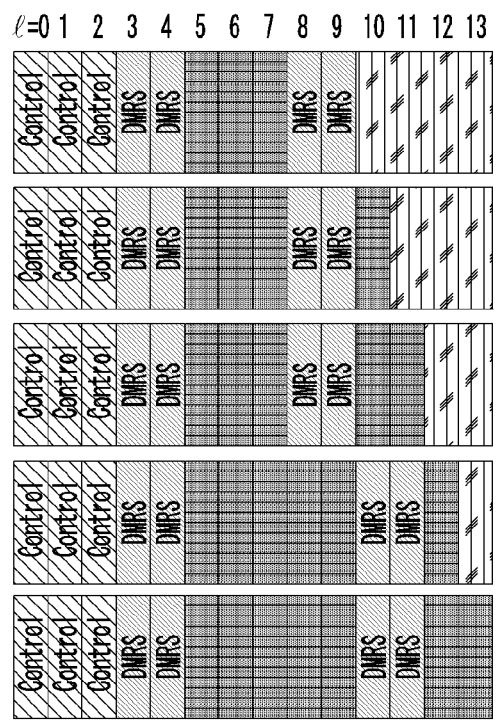

FIG. 7 illustrates an example DMRS position.

Described below is multiplexing, specifically frequency domain multiplexing (FDM), between DL DMRS and CSI-RS and between UL DMRS and SRS in the same symbol.

Figure 8:
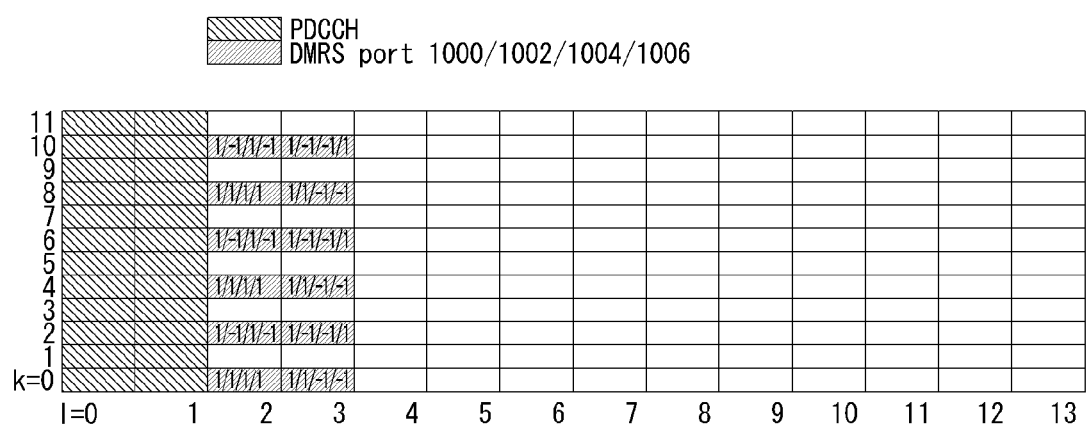
FIG. 8 is a view illustrating an example pattern for DMRS type 1.
Figure 8:
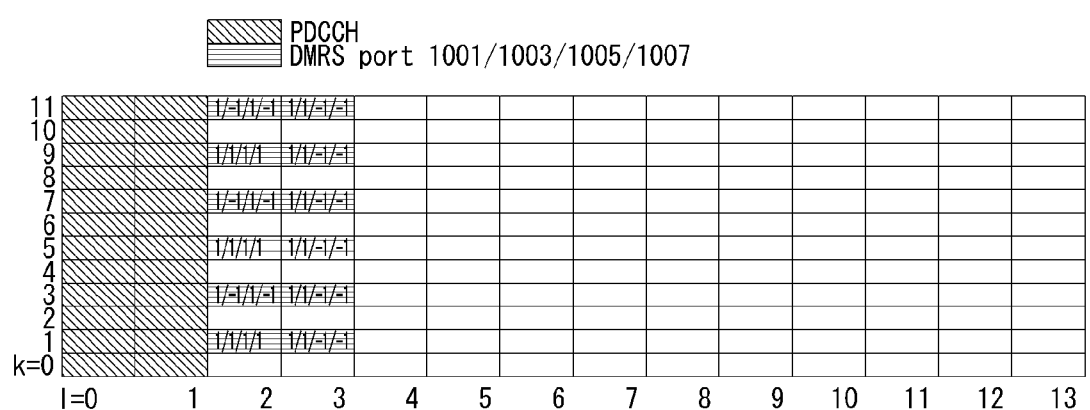

DMRS type 1 supports up to eight ports, and the position and cover code value $(w_f(k') \cdot w_t(l))$ of each DMRS port in the PRB are as shown in FIG. 8, for example.

Assumed in FIG. 7 are a slot including 14 symbols, two-symbol front-load DMRS, and no additional DMRS.

FIG. 8 is a view illustrating an example pattern for DMRS type 1.

DMRS type 2 supports up to 12 ports and is under the same assumption given for FIG. 8.

Figure 9:
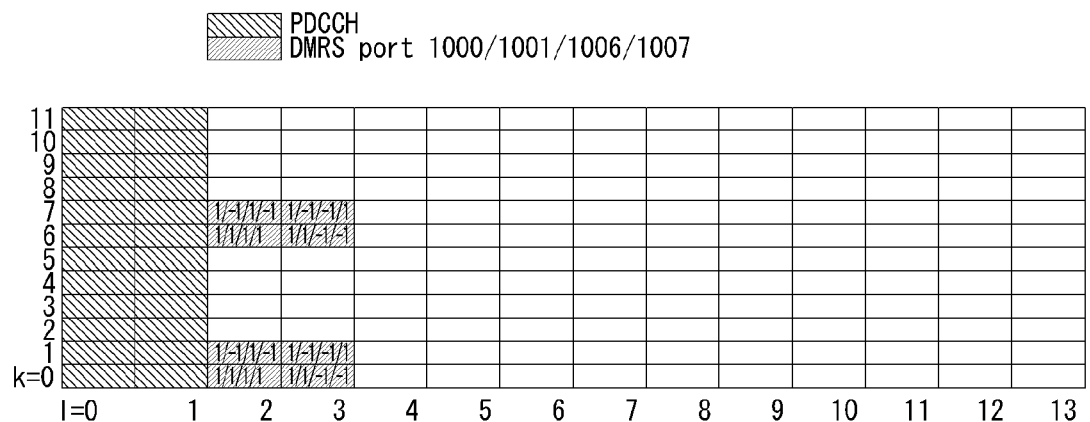
FIG. 9 illustrates an example pattern for DMRS type 2.
Figure 9:
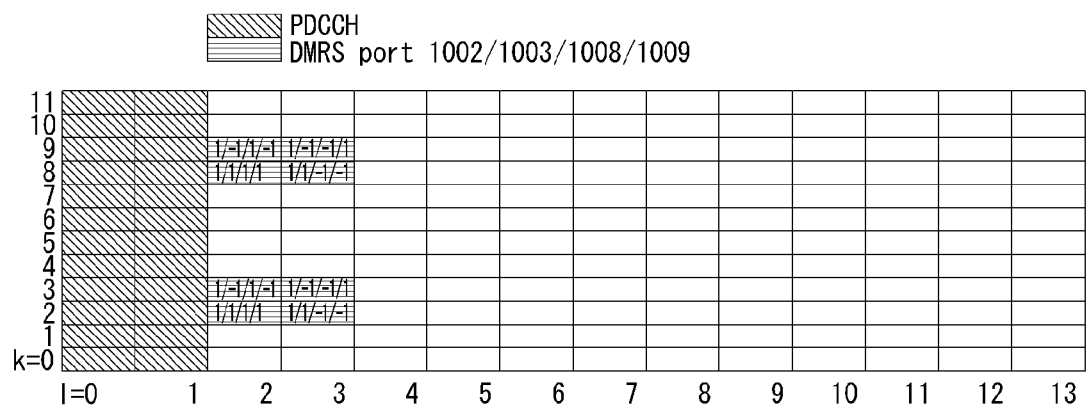
Figure 9:
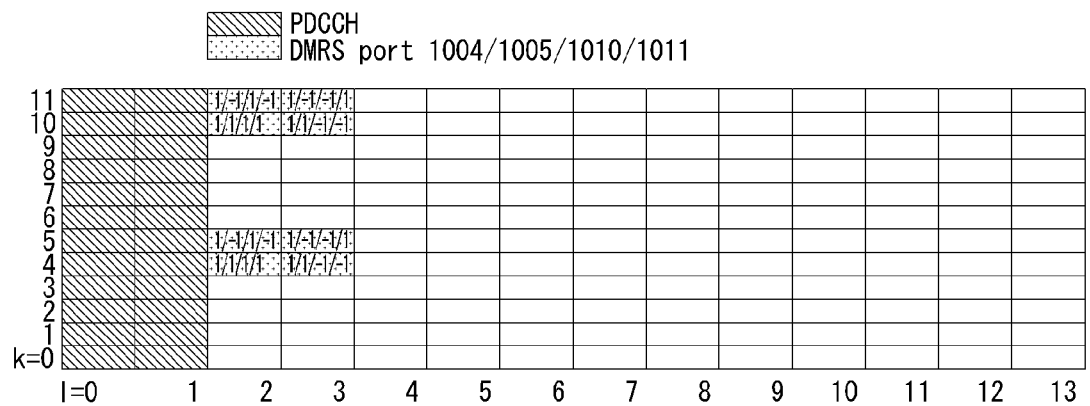

That is, FIG. 9 illustrates an example pattern for DMRS type 2.

Further, in the NR system, CSI-RS may be used not only for CSI acquisition (measurement and reporting) but also for measurement for layer 3 mobility (e.g., L3 RSRP), (analog) beam management (e.g., beam selection, selected beam ID and beam quality reporting), and fine time/frequency tracking (hereinafter, 'TRS') due to lack of LTE CRS.

Table 6 represents example CSI-RS RE patterns.

TABLE 6

| X  | Density [RE/RB/port] | N | (Y, Z) | CDM |
|----|----------------------|---|--------|-----|
| 1  | >1, 1, 1/2, 1/3     | 1 | N.A.   | No CDM |
| 2  | 1, 1/2, 1/3         | 1 | (2, 1) | FD-CDM2 |
| 4  | 1, 1/2, 1/3         | 1 | (4, 1) | FD-CDM2 |
| 4  | 1, 1/2, 1/3         | 2 | (2, 2) | FD-CDM2, CDM4(FD2, TD2) |
| 8  | 1, 1/2, 1/3         | 1 | (2, 1) | FD-CDM2 |
| 8  | 1, 1/2, 1/3         | 2 | (2, 2) | FD-CDM2, CDM4(FD2, TD2) |
| 8  | 1, 1/2, 1/3         | 4 | (2, 2) | FD-CDM2, CDM8 |
| 12 | 1, 1/2, 1/3         | 1 | (2, 1) | FD-CDM2, FD-CDM4 |
| 12 | 1, 1/2, 1/3         | 2 | (2, 2) | FD-CDM2, CDM4(FD2, TD2) |
| 16 | 1, 1/2, 1/3         | 2 | (2, 2) | FD-CDM2, CDM4(FD2, TD2) |
| 16 | 1, 1/2, 1/3         | 4 | (2, 2) | FD-CDM2, CDM4(FD2, TD2), CDM8 |
| 24 | 1, 1/2, 1/3         | 2 | (2, 2) | FD-CDM2, FD-CDM4, CDM8 |
| 24 | 1, 1/2, 1/3         | 4 | (2, 2) | FD-CDM2, CDM4(FD2, TD2), CDM8 |
| 32 | 1, 1/2, 1/3         | 4 | (2, 2) | FD-CDM2, CDM4(FD2, TD2), CDM8 |

The CSI-RS pattern (or CSI-RS resource) and port configuration depending on each CSI-RS purpose may differ. Typically, the following assumption may be made.

(1) For CSI acquisition/mobility: up to 32 ports, frequency domain density (fD)=1, <1, (>1) [RE/PRB/port], time domain density (tD)=1 [RE/slot/port]

(2) For beam management (BM): up to two to eight ports, fD=1, >1, (<1), tD=1, >1

(3) For tracking reference signal (TRS): 1 port, fD>1, tD=1, >1

In other words, for beam management and TRS purposes, a relatively small maximum number of ports and a high frequency/time density of one or more are defined.

Here, the feature of tD>1 may include not only transmission of one CSI-RS resource in a plurality of symbols in the same slot but also transmission of a plurality of CSI-RS resources that are quasi-co-located (QCLed) with each other or transmit the same antenna port in different symbols in the same slot.

This extended scheme may commonly apply to what is described below.

In the case of legacy LTE system, the DMRS RE is always in a fixed position.

Thus, the resource element (RE) pattern where a CSI-RS is configurable is defined except for the DMRS RE position.

However, in the case of NR system, the DMRS RE may have a different position in the frequency domain depending on each port, and the position and number of DMRS symbols may be variable (in particular, more variable if even mini-slots are considered).

Therefore, many restrictions may be imposed on determining the RE position where CSI-RS is configurable except for all possible DMRS RE positions.

Thus, it is needed to allow (or define) frequency domain multiplexing (FDM) in a specific (or the same) symbol between CSI-RS and (all or some) DMRSs.

FDM between DL DMRS and CSI-RS is described below in greater detail.

DMRS type 1 has the comb-2 structure in the frequency domain and, thus, does not allow FDM between CSI-RS and DMRS or may allow limited CSI-RS/DMRS FDM for (no frequency domain CDM-featured) 1-port CSI-RSs, some N-port CSI-RSs that use (Y,Z)=(1, 2 or larger integer) as the component RE pattern, or CSI-RSs configured for a specific purpose.

Here, Y denotes the number of adjacent REs in the frequency domain, and Z denotes the number of adjacent REs in the time domain.

The component RE pattern may be interpreted as meaning the resource constituting a CDM group.

The specific purpose may be a beam management or TRS purpose.

Where a CSI-RS is used for beam management, the CSI-RS may be configured via an RRC message constituted of a resource setting, a reporting setting, and a measurement setting.

The signaling framework may be utilized for CSI acquisition as well as for beam management.

The signaling framework indicates the relationship between the resource setting, reporting setting, and measurement setting and may also be represented as CSI framework.

Thus, the beam management-purpose CSI-RS may be differentiated explicitly with a purpose/type differentiator (or indicator) set for the resource setting or may be differentiated by reporting information configured in the reporting setting linked to the resource setting via the measurement setting.

For example, for the beam management purpose, some of, e.g., beam ID (e.g., CRI), CSI-RS/SS block-based L1 RSRP, and beam grouping information (e.g., CRI group ID) may be included in the reporting parameters.

For the CSI acquisition purpose, a combination of PMI, CQI, RI, and CRI may be configured.

In particular, there may be such an occasion where RS only without reporting information (no report, none) is transmitted for the UE's Rx beam selection purpose.

In other words, there may be no linked reporting setting or a resource setting which has a feature linked to the NULL setting may also indicate the beam management purpose.

By the above-described features, the purposes of CSI-RS may be differentiated implicitly.

The purposes of CSI-RS may also be differentiated by CSI-RS patterns or features.

For example, the purposes of CSI-RS may be differentiated implicitly by the feature of fd>1 (or a specific value) and/or td>1 (or a specific value).

Thus, it is allowed to configure a CSI-RS in the symbol where a DMRS symbol is transmittable restrictively to CSI-RS resources included in the resource setting with the features.

For example, the CSI-RS with the above-described features, among the resource settings, may be allowed to be transmitted in the third and/or fourth symbol if the system bandwidth is a predetermined value or less and in the fourth and/or fifth symbol if the system bandwidth is a predetermined value or more.

Or, transmission of a CSI-RS in the symbol position may be allowed only for 1-port CSI-RS resources or some N-port CSI-RSs that use (Y,Z)=(1, 2 or larger integer) as the component RE pattern.

TRS-purpose CSI-RSs may be configured separately from the resource settings or may be included in the resource settings and, similarly to CSI-RSs transmitted for the purpose of the UE's Rx beam selection, only RS may be transmitted without reporting, there may be no linked reporting setting or they may be implicitly differentiated by a feature linked to the NULL setting.

Or, the TRS-purpose CSI-RSs may be differentiated by the CSI-RS patterns or features.

For example, the TRS-purpose CSI-RSs may be differentiated implicitly by the feature of number of ports=1, fD>1 (or a specific value), and/or tD>1 (or a specific value).

Or, there may be included an indicator that they may be utilized for time/frequency tracking purposes.

This may be replaced with an indicator for the feature that they are QCLed between different CSI-RS symbols (or resources) transmitted in a single or multiple slots.

Since DMRS type 2 may use up to four consecutive REs per port in the frequency domain, a limitation may be imposed so that multiplexing with CSI-RS is allowed for all configurations or multiplexing with the CSI-RS is allowed only in a very special case.

Here, in the configuration of the CSI-RS excluded from multiplexing, five or more REs may be occupied in one symbol, or fD>1 and, in the inter-CSI-RS RE interval, there is a high chance of conflict or a conflict is unavoidable.

In such aspects, if the following conditions (or subsets of the following conditions) are met, the configuration for CSI-RS may be limited in the DMRS symbol position.

(1) N-port or more
(2) N-port or more, plus where M or more (consecutive) component RE patterns are aggregated in the same symbol (set) (where M is an integer not less than two).
  Where they are inconsecutively aggregated, FDM between DMRS and CSI-RS may be allowed (e.g., when there is an interval of 2 Res or larger)
(3) Specific CDM pattern/length:
  Where CDM-8 is configured (or applied), a specific CDM-8 type may be restricted to lower the chance of conflict.
  For example, only CDM-8 types which are constituted of (subcarriers, symbols)=(2, 4) are allowed while CDM-8 types constituted of (subcarriers, symbols)=(4, 2) are not.
  The above restriction may be limited to the cases where they are inconsecutively aggregated to constitute CDM-x (e.g., x=4 or 8).
  That is, it may be the case where CDM-x is configured over the component RE pattern.
  The configuration limitation to a specific CDM length (e.g., x=2) may be used for the purpose of minimizing interference with the DMRS of neighboring cell upon multiplexing.
(4) Specific fD value(s) meeting fD>1 (e.g., fD=2) are allowed (because the interval is 6 spacings if the distribution is assumed to be uniform), and fD=3 may not (because the interval is four spacings when the distribution is uniform).
  The limited fD values may be set to differ depending on the number of ports and RE patterns.

Next described in detail is FDM between UL DMRS and SRS.

In NR, the sounding reference signal (SRS) has a Comb structure in the frequency domain, and 1, 2, or 4 is used as the Comb value.

For the SRS, up to four symbols may be transmitted in one slot.

This is for, e.g., UL beam management or coverage limited UE.

In NR, the UL supports discrete Fourier transform (DFT)-spread OFDM waveform as does the LTE UL (however, the maximum transmission rank is 1) and also supports CP OFDM waveform as does the DL (the maximum transmission rank is 4 to 8).

For the DFT-s OFDM waveform, only DMRS type 1, which has a comb structure may be used.

The SRS may be transmitted aperiodically only at once, (periodically) several times semi-persistently from the time of activation to the time of deactivation, or periodically by RRC configuration (always until RRC is configured or disconnected).

For all those cases, SRS symbol position, comb value, or comb offset may be (previously) set by, e.g., RRC or MAC CE.

At this time, symbol positions where an SRS is configurable may be set except for UL DMRS positions.

However, there may be many DMRS-configurable symbol positions and the number of symbols may be large and, when the cell is crowd with UEs, and when various slot structures including mini-slot are considered, it may be preferable to allow FDM between UL DMRS and SRS.

In other words, whether SRS transmission is allowed may be defined according to the following conditions in the DMRS symbol-transmittable position, i.e., the third, fourth, or x_ith position (i=1, . . . , X, X is the total number of symbols of the additional DMRS, and x_i is the symbol position of the ith additional DMRS) if the system bandwidth is a predetermined value or less and the fourth, fifth, or x_ith position (i=1, . . . , X, X is the total number of symbols of the additional DMRS, and x_i is the symbol position of the ith additional DMRS) if the system bandwidth is a predetermined value or more.

For DMRS type 1, allowed only except for where SRS comb is 1
  For DMRS type 2, FDM with SRS is not allowed
  If SRS comb 6 is supported, comb 6 is allowed.

Additionally, if SRS is transmitted in two symbols or more in one slot, different SRSs may be transmitted in different RE positions (symbol-level hopping).

Upon symbol-level hopping, comb offset or PRB set may be varied.

Thus, given that a plurality of UL DMRS symbols may be transmitted together in such a case, SRS may be configured in a plurality of symbols and, if all or some of the symbols that may conflict with DMRS symbols are included in the SRS configuration, it may be more preferable to disable symbol-level SRS hopping or to allow only a specific hopping pattern.

For example, hopping may be configured with each two adjacent symbols bundled given that DMRS is transmittable adjacently in up to two symbols.

Or, such a configuration may be made so as to perform hopping only on PRB (set) with the comb value and comb offset maintained.

Given, e.g., the likelihood of inter-port FDM or power boosting along with those described above, it may be allowed to make SRS configuration in the DMRS symbol position only for p-port or less SRSs (where P is an integer not less than two).

P-port or more SRSs may not be allowed for multiplexing with DMRS, or FDM may be allowed only for a specific DMRS config. depending on the inter-port subcarrier interval.

For example, if UL DMRS type 1, SRS comb 4, and FDM is performed between #{1,2} ports and #{3,4} ports, SRS may be allowed to be FDMed in the DMRS symbol position only for the patterns where inter-port group subcarrier interval is 2.

Next, time domain behaviors of CSI-RS and SRS are described.

As described above, CSI-RS and SRS may have three time domain behaviors: aperiodic (one shot); semi-persistent (multi-shot); and periodic.

Whether to allow FDM with CSI-RS/SRS for all or some DMRS symbols and the degree may be set to differ depending on the time domain behaviors of CSI-RS/SRS and considerations for whether to perform FDM in the aspects of DMRS, CSI-RS, and SRS RE pattern.

Since aperiodic CSI-RS/SRS is triggered by DCI, a configuration of FDM with CSI-RS/SRS in the DMRS symbol position (on the high layer configuration) may be allowed.

At this time, after a plurality of CSI-RS/SRS RE positions are configured in the high layer, pattern(s) where conflict is avoidable may be designated considering the pattern of DMRSs FDMed by MAC CE or DCI.

In particular, whether DMRS is transmitted in the second symbol of front-load DMRS may differ depending on the number of SU-MIMO layers or the context of MU-MIMO transmission.

Thus, such a pattern may be indicated that after all CSI-RS/SRS SE patterns are configured by RRC in the (first and) second symbol position of the front-load DMRS, conflict is avoided by DCI when transmitting aperiodic CSI-RS/SRS in the PDSCH where DMRS is transmitted in the second symbol.

The two DCIs may be transmitted in different PDCCHs (at different timings), rather than in the same PDCCH.

For example, aperiodic CSI-RS triggering may be indicated with UL DCI, and PDSCH allocation may be indicated by DL DCI.

If conflict cannot be avoided with a preset pattern, only one of the two may be received or transmitted by a predetermined priority rule between aperiodic CSI-RS/SRS and DMRS.

If the priority of DMRS is higher, CSI-RS/SRS is received/transmitted in other frequency domain than the conflicting frequency domain or the whole reception/transmission may not be performed.

Since periodic (and semi-persistent) CSI-RS/SRS has a high chance of conflict depending on the dynamically varying DMRS pattern, it may be more preferable to allow no configuration for CSI-RS/SRS in all or some DMRS symbol positions.

For example, if periodic CSI-RS/SRS configuration is not allowed in the first and/or second DMRS symbol position (fourth or fifth symbol) of the front-load DMRS, the base station may dynamically configure a DMRS without concern about conflict fitting the SU-MIMO, MU-MIMO transmission context.

In sum, a symbol position set configurable by RRC for aperiodic CSI-RS/SRS is rendered to be larger than a symbol position set configurable by RRC for periodic CSI-RS/SRS.

The above method may apply differently depending on DMRS types.

For example, multiplexing with CSI-RS is much easier in DL DMRS type 2 than in type 1.

Thus, where DL DMRS type 2 is configured, periodic CSI-RS may be configured in (all or some) DMRS symbol positions.

However, if DL DMRS type 1 is configured, periodic CSI-RS may be defined not to be configured in (all or some) DMRS symbol positions.

In contrast, multiplexing with SRS is much easier in UL DMRS type 1 than in DMRS type 2.

Thus, where UL DMRS type 1 is configured, periodic SRS is rendered to be configured in (all or some) DMRS symbol positions.

However, if UL DMRS type 2 is configured, periodic SRS may be rendered not to be configured in (all or some) DMRS symbol positions.

Figure 10:
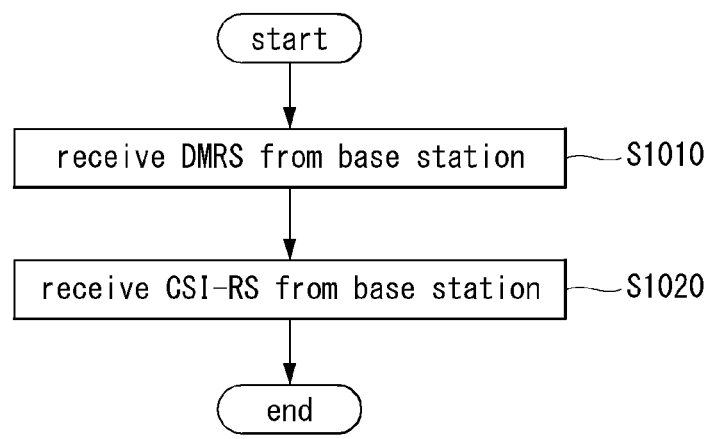
FIG. 10 is a flowchart illustrating an example method of operation of a UE for multiplexing a DMRS and a CSI-RS.

FIG. 10 is a flowchart illustrating an example method of operation of a UE for multiplexing a DMRS and a CSI-RS.

First, a UE receives a DMRS from a base station (S1010).

The type of the DMRS may be DMRS type 1 or DMRS type 2.

The UE receives a CSI-RS from the base station (S1020).

Here, frequency division multiplexing (FDM) between the DMRS and the CSI-RS in a specific symbol may be determined based on the DMRS type.

If the DMRS type is set to DMRS type 1, and the CSI-RS is set for a specific purpose, the DMRS and the CSI-RS may be FDMed in the specific symbol.

The specific purpose may be a beam management or tracking reference signal (TRS) purpose.

The specific purpose may be differentiated by an indicator included in RRC signaling.

If the DMRS type is set to DMRS type 2, the DMRS and the CSI-RS may be FDMed in the specific symbol.

In addition to setting the DMRS type to DMRS type 2, more limitation may be put so that only when the CSI-RS is N-(or larger) port CSI-RS and two or more CSI-RS component RE patterns are aggregated in one symbol, the DMRS and the CSI-RS are FDMed in the specific symbol.

Figure 11:
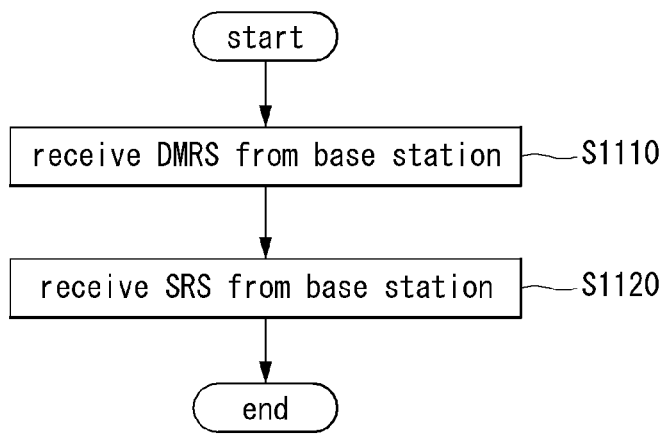
FIG. 11 is a flowchart illustrating a method of operation of a UE for multiplexing a DMRS and an SRS.

FIG. 11 is a flowchart illustrating a method of operation of a UE for multiplexing a DMRS and an SRS.

First, the UE transmits a DMRS to a base station (S1110).

The UE transmits the SRS to the base station (S1120).

Here, frequency division multiplexing (FDM) between the DMRS and the SRS in a specific symbol may be determined based on the DMRS type.

Likewise, the type of the DMRS may be DMRS type 1 or DMRS type 2.

If the DMRS type is set to DMRS type 1, and the SRS is configured with a comb structure other than comb 1 in the frequency domain, the DMRS and the SRS may be FDMed in the specific symbol.

If the DMRS type is set to DMRS type 2, the DMRS and the CSI-RS may not be FDMed in the specific symbol.

CSI-RS configuration methods that enable FDM with DMRS in terms of RRC configuration have been described above.

However, collision between CSI-RS and DMRS may be inevitable for some reasons (e.g., wrong CSI-RS configuration by the network).

Now described is a method of operation by a UE to handling collision between CSI-RS and DMRS as proposed in the disclosure.

As used herein, the term "collision" means a whole or partial overlap in a configured (or indicated) resource element (RE) position.

Here, the configured RE may be interpreted as a signal transmitted/received.

Collision between aperiodic CSI-RS and DMRS (first embodiment) and (2) collision between periodic/semi-persistent CSI-RS (or TRS) and DMRS (second embodiment) are described in order.

First Embodiment

The first embodiment is to puncture CSI-RS RE(s) which have a CDM relationship, in the time and/or frequency domain, with specific RE(s) where collision occurs between an aperiodic CSI-RS and DMRS.

For example, if eight ports are configured in the form of (2,2) CDM-4 and (2,2) CDM-4, and one RE of the first CDM-4 collides with the DMRS, the (2,2) REs belonging to the CDM group are punctured.

In (2,2), the first '2' denotes that the number of adjacent REs to which CDM-4 applies in the time domain is two, and the second '2' denotes that the number of adjacent REs to which CDM-4 applies in the frequency domain is two.

CDM-4 denotes a CDM of length 4.

In such a case (i.e., where one RE of the first CDM-4 collides with the DMRS), CSI may be configured with the number of antenna ports reduced to the number of non-colliding antenna ports and be reported to the base station (method 1), or CSI may be configured based on a preset antenna port count and be reported to the base station (method 2). Method 1 and method 2 both may be possible.

In the first method (method 1), the adjusted number of antenna ports may be additionally fed back.

In the second method (method 2), feedback of information for the colliding RE/antenna port/CDM group may be added, and an assumption upon channel estimation for the punctured antenna ports or an assumption for precoding matrix index (PMI) may be specified.

Additionally, not only the colliding CDM group but all the CSI-RS ports which are tied up to the same CSI-RS resource as the colliding RE(s) may be punctured for the whole CSI-RS band or the PRB set where an overlap has occurred in the corresponding slot.

Collision with REs, as used herein, may be interpreted as having the same meaning as an inter-signal overlap or collision or an overlap with REs.

As used herein, 'puncturing' may mean that no measurement for the corresponding RE(s) is included in CSI-RS measurement on the PRB set which has caused a collision, i.e., PDSCH-scheduled and/or an operation that does not include a measurement in the corresponding RE(s) upon reception of the PDSCH present in the corresponding RE region.

The puncturing operation may be specified not to include all the symbol (set) including the colliding RE(s) in CSI calculation in terms of CSI-RS measurement.

This is why an abnormal value may be produced only for the CSI of the colliding part upon subband reporting.

In addition to, or separately from, what has been described above, upon aperiodic CSI-RS-based CSI measurement and reporting, the UE may report information indicating that the CSI measurement has been partially contaminated or a collision has occurred in the CSI-RS to the base station.

Here, such reporting may be carried out by providing a specific CQI field value specified to be used for such or via a rule to send a null value or agreed-on value in a specific field of the CSI.

And/or, a specific flag may be included in a higher-priority CSI parameter (e.g., rank indicator (RI) or CSI-RS resource indicator (CRI)) and, if the flag turns 'ON,' it may be specified that reporting on the subsequent CSI parameters (e.g., PMI 1/2, channel quality indicator (CQI)) is omitted.

The specific CQI field may be a CQI field for a specific codeword (e.g., the first codeword) in which case if the UE reports a specific value in the CQI field (e.g., CQI for CW1) to the base station, it may be specified that the CSI parameter set (e.g., CQI for CW2, PMI) encoded later may be omitted or transmitted, with the same filled with a specific value (e.g., zero padding).

Or, in such a case, the UE may perform the same reporting as the CSI reported at a prior time.

As another embodiment, in the case of semi-persistent scheduling (SPS), the DMRS may be punctured unlike in the first embodiment.

In other words, if a collision occurs in specific REs between the aperiodic CSI-RS and DMRS in the context where SPS is performed, the DMRS is punctured to protect the aperiodic CSI-RS.

Second Embodiment

In the second embodiment, when a collision occurs in specific RE(s) between periodic/semi-persistent CSI-RS/ tracking RS (TRS) and DMRS, the DMRS may be punctured to protect the CSI-RS, reception of the PDSCH associated with the DMRS may be abandoned, or a NACK may be transmitted for the PDSCH.

Here, TRS means an RS used for time and/or frequency tracking, and CSI-RS may be used for the purpose.

The second embodiment may be intended to puncture the REs for the CSI-RS/TRS since periodic/semi-persistent CSI-RS/TRS is highly likely to be shared by multiple UEs and, when the base station transmits the DMRS for a specific UE, it may influence the channel estimation by the other UEs.

The DMRS puncturing operation may be defined for the colliding REs, REs belonging to the CDM group including the colliding REs, or the DMRS symbol (set) including the colliding REs (i.e., including the REs belonging to the CDM group).

At this time, if a collision occurs between CSI-RS and DMRS so that demodulation is enabled with non-colliding symbols, such a definition (or setting) may be made so that the number of additional DMRS symbols automatically increases (in proportion to the number of colliding symbols).

The above-described DMRS puncturing operation may be rendered to be addressed as the base station is so implemented and be replaced with the phrase "UE does not expect (or assume) collision between periodic/semi-persistent CSI-RS/TRS and DMRS" or "UE does not expect that DMRS RE(s) are indicated in the RE(s) for periodic/semi-persistent CSI-RS/TRS."

Additionally, when the event occurs, the UE may regard it as abnormally receiving an indication from the network and it may be specified that the corresponding CSI-RS/TRS RE(s) or symbol(s) are not included in channel estimation.

Here, the occurrence of the event means that a collision occurs in a specific RE(s) between periodic/semi-persistent CSI-RS/tracking RS (TRS) and DMRS.

In addition to, or separately from, what has been mentioned above, the UE may report information indicating that a collision occurs between CSI-RS and DMRS to the base station upon semi-persistent (SP)/periodic (PR) CSI-RS-based measurement and reporting.

Here, such reporting may be carried out by providing a specific CQI field value specified to be used for such or via a rule to send a null value in a specific field of the CSI.

Or, in such a case, the UE may perform the same reporting as the CSI reported at a prior time.

In sum, the method proposed herein features that, for aperiodic CSI-RSs whose attribute is more like that of UE-dedicated reference signals (RSs), the CSI-RS is punctured while protecting the DMRS and, for periodic/semi-persistent CSI-RSs whose attribute is more like that of UE-shared RSs, the CSI-RS is protected.

Such a principle may be distinguished with time domain behaviors, such as aperiodic and periodic/semi-persistent and/or may be replaced with adding a flag for whether to permit CSI-RS puncturing upon CSI-RS configuration (or indication).

Figure 12:
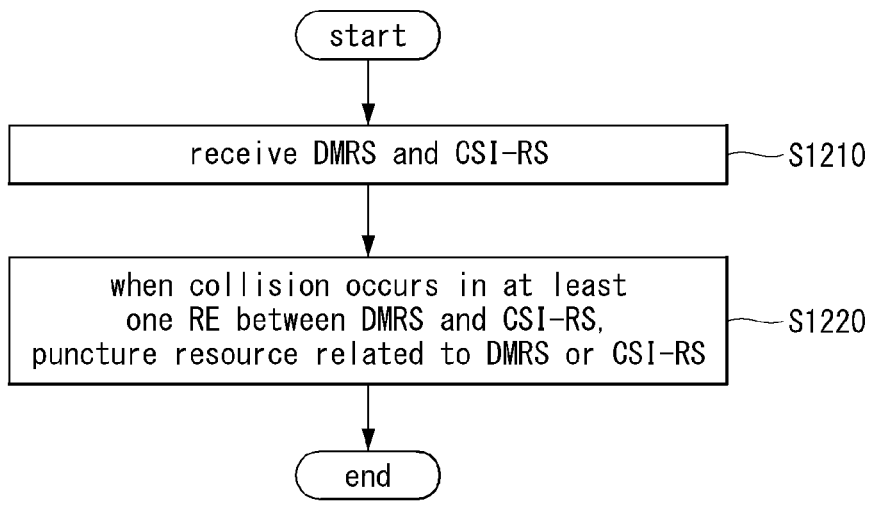
FIG. 12 is a flowchart illustrating an example method by a UE when a collision between a CSI-RS and DMRS occurs as proposed in the disclosure.

FIG. 12 is a flowchart illustrating an example method by a UE when a collision between a CSI-RS and DMRS occurs as proposed in the disclosure.

First, the UE receives a DMRS and a CSI-RS from the base station (S1210).

If a collision occurs in at least one resource element (RE) between the DMRS and the CSI-RS, the UE punctures the resource related to the DMRS or the resource related to the CSI-RS based on the time domain behavior of the CSI-RS (S1220).

Here, puncturing the resource related to the CSI-RS may be interpreted as excluding the at least one colliding resource element from CSI-RS measurement.

In relation to the puncturing, the UE may perform measurement based on the CSI-RS received in the resource which does not include the at least one resource element and report information for the measurement to the base station.

Puncturing the resource related to the DMRS may be interpreted as excluding the at least one colliding resource element from use in demodulation.

In relation thereto, the UE may perform demodulation based on the DMRS received in the resource which does not include the at least one resource element.

If the time domain behavior of the CSI-RS is of an aperiodic CSI-RS, the UE may puncture the CSI-RS-related resource.

Here, the CSI-RS-related resource may be a CSI-RS RE(s) that has a CDM relationship in at least one of time domain or frequency domain with the at least one colliding RE.

If there are multiple CDM groups for CSI-RS, and a collision occurs in the RE(s) in any one of the CDM groups, (i) only the CDM group including the colliding RE is punctured or (ii) all the CDM groups may be punctured as mentioned above.

Additionally, the UE may estimate the channel state based on the received CSI-RS and report information for the estimated channel state to the base station.

In this case, the UE may report the information for the channel state, including information related to the collision, to the base station.

The collision-related information may include at least one of information for the number of antenna ports where no collision occurs or information indicating that a collision has occurred in the CSI-RS-related resource.

If the time domain behavior of the CSI-RS is of a periodic or semi-persistent (SP) CSI-RS, the UE may puncture the DMRS-related resource.

In this case, the UE may receive information related to an additional DMRS configuration from the base station.

The additional DMRS configuration may be determined based on the number of DMRS symbols where the collision has occurred.

Devices to Which the Present Disclosure May Apply

Figure 13:
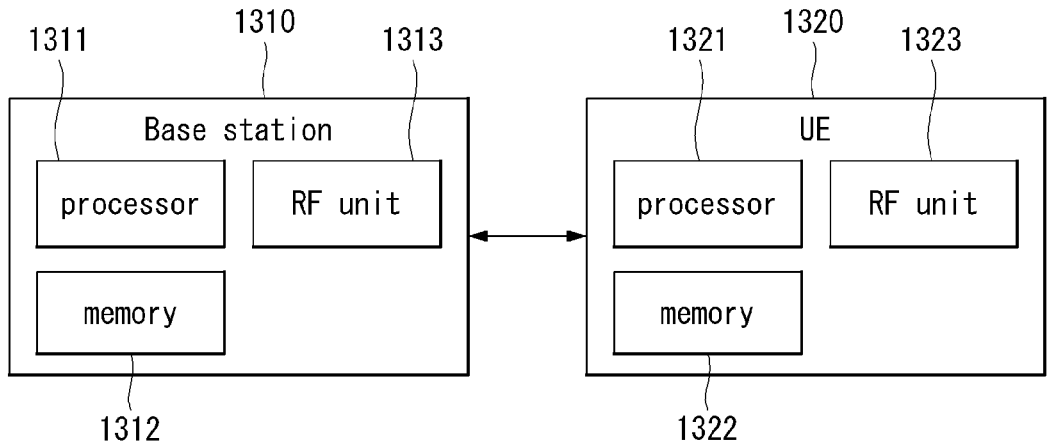
FIG. 13 is a block diagram illustrating a configuration of a wireless communication device to which methods proposed herein are applicable.

FIG. 13 is a block diagram illustrating a configuration of a wireless communication device to which methods proposed herein are applicable.

Referring to FIG. 13, a wireless communication system includes a base station 1310 and a plurality of UEs 1320 positioned in the coverage of the base station.

The base station and the UE each may be represented as a wireless device.

The base station includes a processor 1311, a memory 1312, and a radio frequency (RF) module 1213. The processor implements the functions, processes or steps, and/or methods proposed above in connection with FIGS. 1 to 12. Wireless interface protocol layers may be implemented by the processor. The memory is connected with the processor and stores various pieces of information for driving the processor. The RF module is connected with the processor and transmits and/or receives wireless signals.

The UE includes a processor 1321, a memory 1322, and an RF module 1323.

The processor implements the functions, processes or steps, and/or methods proposed above in connection with FIGS. 1 to 12. Wireless interface protocol layers may be implemented by the processor. The memory is connected with the processor and stores various pieces of information for driving the processor. The RF module is connected with the processor and transmits and/or receives wireless signals.

The memory 1312 and 1322 may be positioned inside or outside the processor 1311 and 1321 and be connected with the processor 1411 and 1421 via various known means.

The base station and/or the UE may include a single or multiple antennas.

Figure 14:
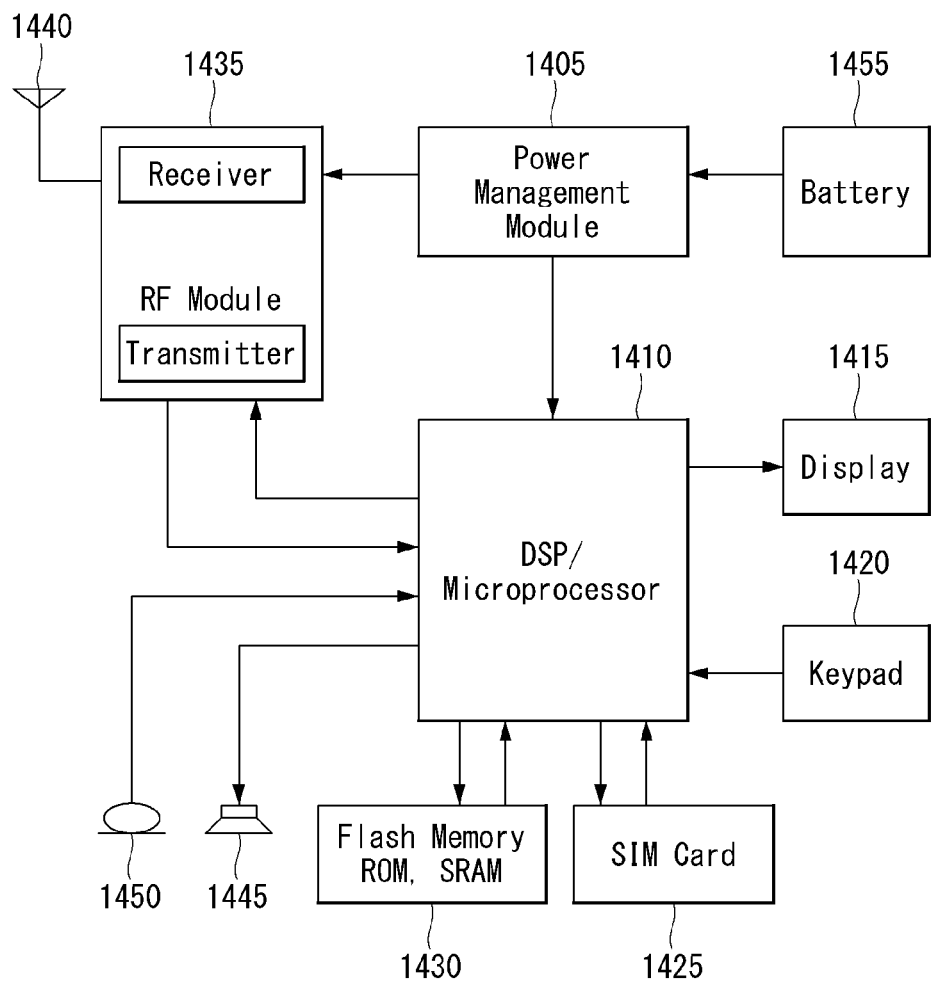
FIG. 14 is a block diagram illustrating a configuration of a communication device according to an embodiment of the disclosure.

FIG. 14 is a block diagram illustrating a configuration of a communication device according to an embodiment of the disclosure.

In particular, FIG. 14 illustrates in greater detail the UE of FIG. 13.

Referring to FIG. 14, the UE may include a processor (or a digital signal processor (DSP)) 1410, an RF module (or RF unit) 1435, a power management module 1405, an antenna 1440, a battery 1455, a display 1415, a keypad 1420, a memory 1430, a subscriber identification module (SIM) card 1425 (which is optional), a speaker 1445, and a microphone 1450. The UE may include a single or multiple antennas.

The processor 1410 implements the functions, processes or steps, and/or methods proposed above in connection with FIGS. 1 to 12. Wireless interface protocol layers may be implemented by the processor.

The memory 1430 is connected with the processor to store information related to the operation of the processor. The memory 1430 may be positioned inside or outside the processor and be connected with the processor via various known means.

For example, the user inputs instruction information, e.g., a phone number, by voice activation using the microphone 1450 or by pressing (or touching) a button of the keypad 1420. The processor receives the instruction information and handles performing a proper function, e.g., calling at the phone number. Operational data may be extracted from the SIM card 1425 or the memory 1430. Further, the processor may display the instruction information or operational information on the display 1415 for convenience or user's recognition.

The RF module 1435 is connected with the processor to transmit and/or receive RF signals. The processor transfers instruction information to the RF module to initiate communication, e.g., to transmit a wireless signal constituting voice communication data. The RF module includes a receiver and a transmitter for receiving and transmitting wireless signals. The antenna 1440 functions to transmit and receive wireless signals. Upon receiving a wireless signal, the RF module transfers the signal for processing by the processor and convert the signal into a base-band signal. The processed signal may be converted into readable or audible information output via the speaker 1445.

Figure 15:
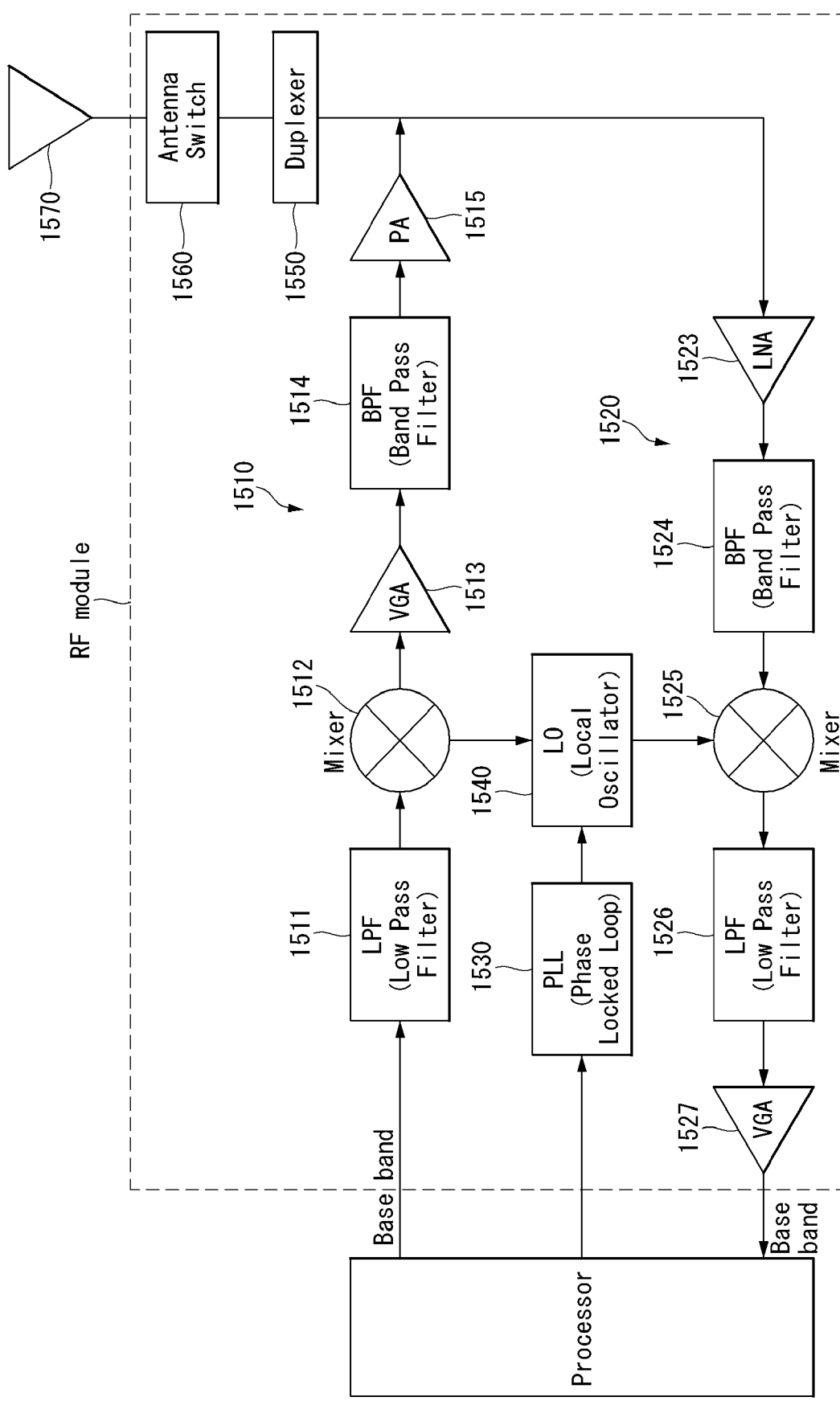
FIG. 15 is a view illustrating an example RF module of a wireless communication device to which a method proposed herein is applicable.

FIG. 15 is a view illustrating an example RF module of a wireless communication device to which a method proposed herein is applicable.

Specifically, FIG. 15 illustrates an example RF module that may be implemented in a frequency division duplex (FDD) system.

First, in a transmission path, the processor described above in connection with FIGS. 13 and 14 processes data to be transmitted and provides an analog output signal to a transmitter 1510.

In the transmitter 1510, the analog output signal is filtered by a low pass filter (LPF) 1511 for removing images caused by digital-to-analog conversion (ADC), up-converted from baseband to RF by an up-converter (e.g., Mixer) 1512, and amplified by a variable gain amplifier (VGA) 1513. The amplified signal is filtered by a filter 1514, further amplified by a power amplifier (PA) 1515, routed via duplexer(s) 1550/antenna switch(es) 1560, and transmitted via an antenna 1570.

In a reception path, the antenna 1570 receives signals from the outside and provides the received signals. The signals are routed via the antenna switch(es) 1560/duplexers 1550 and are provided to a receiver 1520.

In the receiver 1520, the received signals are amplified by a low noise amplifier (LNA) 1523, filtered by a band pass filter 1524, and down-converted from RF to baseband by a down-converter (e.g., a mixer) 1525.

The down-converted signals are filtered by a low pass filter (LPF) 1526 and amplified by a VGA 1527 so that an analog input signal is obtained. The obtained analog input signal is provided to the processor described above in connection with FIGS. 13 and 14.

A local oscillator (LO) generator 1540 generates transmission and reception LO signals and provides them to the up-converter 1512 and the down-converter 1525, respectively.

A phase locked loop (PLL) 1530 receives control signals from the processor to generate transmission and reception LO signals at proper frequencies and provide the control signals to the LO generator 1540.

The circuits shown in FIG. 15 may have a different arrangement than that shown in FIG. 15.

Figure 16:
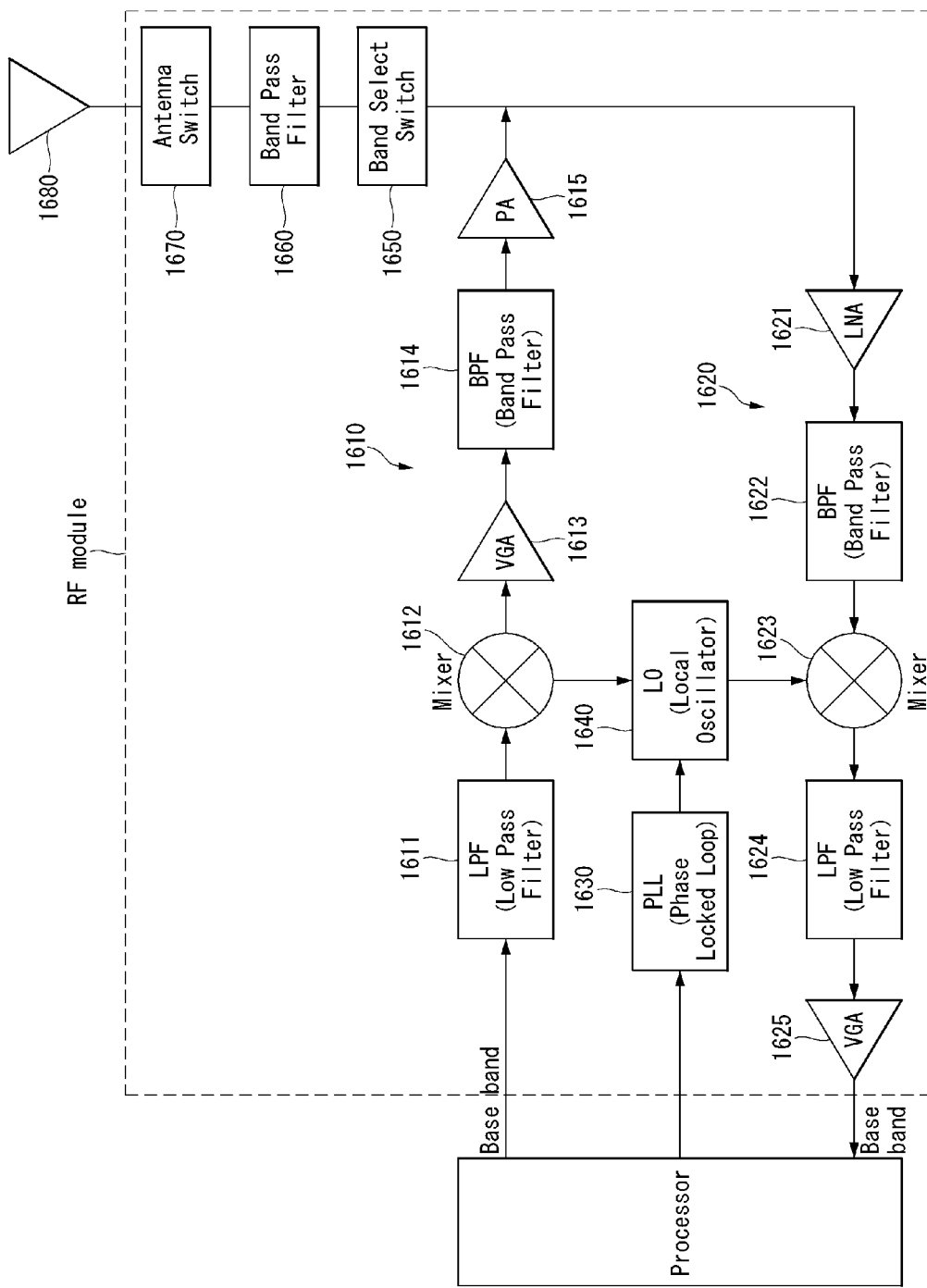
FIG. 16 is a view illustrating another example RF module of a wireless communication device to which a method proposed herein is applicable.

FIG. 16 is a view illustrating another example RF module of a wireless communication device to which a method proposed herein is applicable.

Specifically, FIG. 16 illustrates an example RF module that may be implemented in a time division duplex (TDD) system.

In the TDD system, the transceiver 1610 and receiver 1620 of the RF module are identical in structure to the transceiver and receiver of the RF module in the FDD system.

The following description of the RF module of the TDD system focuses primarily on differences from the RF module of the FDD system, and the description in connection with FIG. 15 may apply to the same structure.

The signal amplified by the power amplifier (PA) 1615 of the transmitter is routed via the band select switch 1650, the band pass filter (BPF) 1660, and antenna switch(es) 1670 and is transmitted via the antenna 1680.

In a reception path, the antenna 1680 receives signals from the outside and provides the received signals. The signals are routed via the antenna switch(es) 1670, band pass filter 1660, and band select switch 1650 and are provided to the receiver 1620.

The above-described embodiments regard predetermined combinations of the components and features of the disclosure. Each component or feature should be considered as optional unless explicitly mentioned otherwise. Each component or feature may be practiced in such a manner as not to be combined with other components or features. Further, some components and/or features may be combined together to configure an embodiment of the disclosure. The order of the operations described in connection with the embodiments of the disclosure may be varied. Some components or features in an embodiment may be included in another embodiment or may be replaced with corresponding components or features of the other embodiment. It is obvious that the claims may be combined to constitute an embodiment unless explicitly stated otherwise or such combinations may be added in new claims by an amendment after filing.

The embodiments of the disclosure may be implemented by various means, e.g., hardware, firmware, software, or a combination thereof. When implemented in hardware, an embodiment of the disclosure may be implemented with, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, an embodiment of the disclosure may be implemented as a module, procedure, or function performing the above-described functions or operations. The software code may be stored in a memory and driven by a processor. The memory may be positioned inside or outside the processor to exchange data with the processor by various known means.

It is apparent to one of ordinary skill in the art that the disclosure may be embodied in other specific forms without departing from the essential features of the disclosure. Thus, the above description should be interpreted not as limiting in all aspects but as exemplary. The scope of the present disclosure should be determined by reasonable interpretations of the appended claims and all equivalents of the present disclosure belong to the scope of the present disclosure.

INDUSTRIAL AVAILABILITY

Although the method of handling collision between DMRS and CSI-RS in the wireless communication system according to the disclosure has been described in connection with examples in which it applies to 5G systems (new RAT systems), the scheme is also applicable to other various wireless communication systems.

The invention claimed is:
1. A method for handling a collision between a demodulation reference signal (DMRS) and a channel state information-reference signal (CSI-RS) in a wireless communication system, the method performed by a user equipment (UE), the method comprising:
receiving the DMRS from a base station;
receiving the CSI-RS from the base station; and based on a collision occurring between the DMRS and the CSI-RS in at least one resource element (RE), puncturing a resource based on a time domain behavior of the CSI-RS, wherein, based on the time domain behavior of the CSI-RS being of an aperiodic CSI-RS, a resource related to the CSI-RS is punctured, and wherein, based on the time domain behavior of the CSI-RS being of a periodic or a semi-persistent (SP) CSI-RS, a resource related to the DMRS is punctured.

2. The method of claim 1, wherein
puncturing the resource related to the CSI-RS includes:
performing measurement based on a CSI-RS received in a resource which does not include the at least one RE; and
reporting information for the measurement to the base station.

3. The method of claim 2, wherein
the information for the measurement includes information related to the collision.

4. The method of claim 1, wherein
the resource related to the CSI-RS is a CSI-RS RE that has a code division multiplexed (CDM) relationship, in at least one of a time domain or a frequency domain, with the at least one RE.

5. The method of claim 4, wherein
information related to the collision includes at least one of Q) information for a number of antenna ports where the collision does not occur or (ii) information indicating that a collision has occurred in the resource related to the CSI-RS.

6. The method of claim 1, wherein
puncturing the resource related to the DMRS includes:
performing demodulation based on a DMRS received in a resource that does not include the at least one RE.

7. The method of claim 1, further comprising
receiving information related to an additional DMRS configuration from the base station.

8. The method of claim 7, wherein
the additional DMRS configuration is determined based on a number of DMRS symbols where the collision has occurred.

9. A UE for handling a collision between a demodulation reference signal (DMRS) and a channel state information-reference signal (CSI-RS) in a wireless communication system, the UE comprising:
a radio frequency (RF) module for transmitting/receiving a radio signal; and
a processor functionally connected with the RF module, wherein the processor is configured to:
receive the DMRS from a base station;
receive the CSI-RS from the base station; and
based on a collision occurring between the DMRS and the CSI-RS in at least one resource element (RE), puncture a resource based on a time domain behavior of the CSI-RS, wherein, based on the time domain behavior of the CSI-RS being of an aperiodic CSI-RS, a resource related to the CSI-RS is punctured, and wherein, based on the time domain behavior of the CSI-RS being of a periodic or a semi-persistent (SP) CSI-RS, a resource related to the DMRS is punctured.

10. The UE of claim 9, wherein
puncturing the resource related to the CSI-RS includes:
performing measurement based on a CSI-RS received in a resource which does not include the at least one RE; and
reporting information for the measurement to the base station.

11. The UE of claim 10, wherein
the information for the measurement includes information related to the collision.

12. The UE of claim 9, wherein
the resource related to the CSI-RS is a CSI-RS RE that has a code division multiplexed (CDM) relationship, in at least one of a time domain or a frequency domain, with the at least one RE.

13. The UE of claim 12, wherein
information related to the collision includes at least one of (i) information for a number of antenna ports where the collision does not occur or (ii) information indicating that a collision has occurred in the resource related to the CSI-RS.

14. The UE of claim 9, wherein
puncturing the resource related to the DMRS includes:
performing demodulation based on a DMRS received in a resource that does not include the at least one RE.

15. The UE of claim 9, wherein the processor is further configured to:
receive information related to an additional DMRS configuration from the base station.

16. The UE of claim 15, wherein
the additional DMRS configuration is determined based on a number of DMRS symbols where the collision has occurred.

* * * * *